US010291759B2

(12) United States Patent
Seo

(10) Patent No.: US 10,291,759 B2
(45) Date of Patent: May 14, 2019

(54) DATA RETURN TYPE VOICE INPUT/OUTPUT DEVICE FOR SMART PHONE

(71) Applicant: RSUPPORT CO., LTD., Seoul (KR)

(72) Inventor: Hyungsu Seo, Gyeonggi-do (KR)

(73) Assignee: RSUPPORT CO., LTD., Seoul (KR)

( * ) Notice: Subject to any disclaimer, the term of this patent is extended or adjusted under 35 U.S.C. 154(b) by 21 days.

(21) Appl. No.: 15/484,453

(22) Filed: Apr. 11, 2017

(65) Prior Publication Data

US 2017/0295273 A1  Oct. 12, 2017

(30) Foreign Application Priority Data

Apr. 11, 2016  (KR) .......................... 10-2016-0044452

(51) Int. Cl.
| | | |
|---|---|---|
| H04B 1/38 | (2015.01) | |
| H04M 1/60 | (2006.01) | |
| H04R 1/10 | (2006.01) | |
| H04R 29/00 | (2006.01) | |
| H04W 4/80 | (2018.01) | |

(52) U.S. Cl.
CPC ....... *H04M 1/6033* (2013.01); *H04M 1/6058* (2013.01); *H04R 1/1041* (2013.01); *H04M 1/6066* (2013.01); *H04M 2250/02* (2013.01); *H04R 1/1016* (2013.01); *H04R 1/1033* (2013.01); *H04R 1/1083* (2013.01); *H04R 29/00* (2013.01); *H04R 2410/05* (2013.01); *H04R 2420/03* (2013.01); *H04R 2420/09* (2013.01); *H04R 2460/03* (2013.01); *H04R 2499/11* (2013.01); *H04W 4/80* (2018.02)

(58) Field of Classification Search
CPC .... H04R 1/1016; H04R 2420/09; H04R 3/00; H04R 5/033; H04R 5/0335; G06F 3/16
USPC ................................. 455/575.2, 559
See application file for complete search history.

(56) References Cited

U.S. PATENT DOCUMENTS

| | | | | |
|---|---|---|---|---|
| 2008/0112569 A1* | 5/2008 | Asada | ................. | G10K 11/178 |
| | | | | 381/71.1 |
| 2009/0080410 A1* | 3/2009 | Aoyagi | ............... | H04M 1/2535 |
| | | | | 370/352 |

FOREIGN PATENT DOCUMENTS

| | | |
|---|---|---|
| KR | 10-2012-0083926 A | 7/2012 |
| KR | 10-2014-0097085 A | 8/2014 |
| KR | 10-1611843 B1 | 4/2016 |

* cited by examiner

*Primary Examiner* — Tu X Nguyen
(74) *Attorney, Agent, or Firm* — Mintz Levin Cohn Ferris Glovsky and Popeo, P.C.; Kongsik Kim; Jonathan Western

(57) ABSTRACT

A voice input/output device is connected to a smart device having a voice signal input/output function is provided. A digital voice signal output by the smart device is output to an output unit, (e.g., ear receiver or a speaker), in the form of a voice, and a voice signal transmitted by the smart device is extracted and input to the smart device as a digital voice signal to generate a sound by the smart device itself in addition to an externally generated sound that is input again with improved quality. Accordingly, a voice signal output by the smart device is extracted using a earphone type device having microphone mounted thereon and the voice signal is input to the smart device again.

4 Claims, 9 Drawing Sheets

DATA RETURN TYPE VOICE INPUT/OUTPUT DEVICE FOR SMART PHONE

CROSS REFERENCE TO RELATED APPLICATION

This application is based on and claims the benefit of priority to Korean Application No. 10-2016-0044452 filed on Apr. 11, 2016, the disclosure of which is incorporated herein by reference.

TECHNICAL FIELD

The present disclosure relates to a voice input/output device, (e.g., an earphone having a microphone mounted thereon or an external speaker) connected to a smart device having a voice signal input/output function, (e.g., smart phone or a tablet computer) and more particularly, a digital voice signal output by the smart device is output to an output unit (e.g., an ear receiver or a speaker), in the form of a voice, but a voice signal transmitted by the smart device is extracted and input to the smart device as a digital voice signal to generate sound by the smart device 10 itself in addition to an externally generated sound is input again with high quality.

RELATED ART

Generally, the smart device 10, such as a smart phone and a tablet computer on which a high-performance processing device, a high-capacity storage device and a high-picture quality touch screen have been mounted, is used as a multi-functional information device configured to perform various application programs away from a simple communication device. The smart device overcomes prior limitations of the time and space in using an information device by minimizing power consumption and maximizing portability through a reduced size and weight. The reduced size and weight are achieved by applying an integrated input/output device having a combined input/output function (e.g., a touch screen adopted in the smart devices) by the integration of a processing device and storage device embedded in the smart device.

Typically, the smart device has processing speed comparable to similar to a desktop computer. Accordingly, an application program for performing various functions, (e.g., game and multimedia information processing), is executed. For example, the current smart device also has an input/output function for a high-quality voice signal. The output and input of a voice signal from the smart device may be performed through a speaker and a microphone mounted on the smart device itself. However, a voice input/output device may be omitted or the output of a voice signal from the smart device may be insufficient as the smart device is reduced in size and weight. In particular, a detachable voice input/output device such as an earphone on which the microphone is mounted, such as that of FIG. 1, is used.

In other words, the conventional voice input/output device has a structure in which a voice signal output by the smart device 10 in an analog form drives the output unit 20, that is, an ear receiver, and a voice signal generated by the microphone 22 is input to the smart device 10. The output unit 20 and the microphone 22 have been integrated in an earphone form to create an external appearance of a single product, but they still require independent electrical structures.

Accordingly, as shown in FIG. 1 a conventional earphone having the microphone 22 mounted thereon utilizes the output unit 20 functions to simply output a voice signal transmitted by the smart device 10 and the microphone 22 functions to simply input an external sound, (e.g., a user's voice), to the smart device 10. In other words, a mutual action of any form cannot be expected between the voice output signal and input signal of the smart device 10.

The individual processing of the output voice signal and the input voice signal inevitably causes a limit in using the smart device 10. For example, there is inevitably a limit to the processing of a sound output by the smart device 10 for minimizing the loss and distortion of a sound and adding the sound to a recording. In particular, assuming that a sound generated by the smart device 10 is recorded on the same smart device 10, a sound transmitted by a speaker mounted on the smart phone or an ear receiver and propagated in the air is recorded to input the sound to a microphone mounted on the smart phone or the microphone 22 mounted on an earphone. In this case, the volume and sound quality are inevitably deteriorated.

In particular, when an application program for capturing a moving image is executed while game is played back using the smart device 10, a game screen is recorded. Additionally, a sound is output while the game is played back or a music file stored in the smart device 10 is played back and inserted as background music while a moving image is captured using the smart device 10. Furthermore, there is a severe problem in that a completed audio and video recording cannot comply with a user's expectation.

The above information disclosed in this section is merely for enhancement of understanding of the background of the disclosure and therefore it may contain information that does not form the prior art that is already known in this country to a person of ordinary skill in the art.

SUMMARY

The present provides a data return type voice input/output device connected to a smart device 10, configured to receive or output a voice. In particular, an output unit 20 may be configured to output an electrical signal in a voice form and a manipulation unit 30 may be connected to a microphone 22 configured to convert a voice into an electrical signal. A digital signal may be configured to be input/output into a data port 13 of the smart device 10. The manipulation unit 30 may be coupled to the data port 13 of the smart device 10. The manipulation unit 30 may include a D/A converter 51 coupled to the output unit 20 and an A/D converter 52 coupled to the microphone 22. A digital voice signal transmitted by the data port 13 may be configured to be converted into an analog voice signal through the D/A converter 51 and transferred to the output unit 20. An analog voice signal generated by the microphone 22 may be configured to be converted into a digital voice signal through the A/D converter 52 and transferred to the data port 13. The voice input/output device may include a connector 40 configured to connect an output-side lead wire which connects the data port 13 and the output unit 20 and passes through the D/A converter 51 and an input-side lead wire which connects the microphone 22 and the data port 13 and passes through the A/D converter 52. A voice signal may be configured to be transmitted by the data port 13 is input to the data port 13 again.

Furthermore, in an exemplary embodiment of the present disclosure, provides a data return type voice input/output device for a smart phone connected to a smart device 10, configured to receive or output a voice, that may include an output unit 20 configured to output an electrical signal in a voice form and a manipulation unit 30 to which a microphone 22 that converts a voice into an electrical signal may be connected. A Bluetooth module 17 may be mounted on the smart device 10, and a Bluetooth module 17 connected to the Bluetooth module 17 of the smart device 10 may be disposed within in the manipulation unit 30. The manipulation unit 30 may include a D/A (e.g., digital/analog) converter 51 connected to the output unit 20 and an A/D converter 52 connected to the microphone 22. The D/A converter 51 and the A/D converter 52 may be connected to the Bluetooth module 17 of the manipulation unit 30. A digital voice signal transmitted from the Bluetooth module 17 of the smart device 10 to the Bluetooth module 17 of the manipulation unit 30 may be converted into an analog voice signal through the D/A converter 51 and transferred to the output unit 20. An analog voice signal generated by the microphone 22 may be converted into a digital voice signal through the A/D converter 52, input to the Bluetooth module 17 of the manipulation unit 30 and transmitted to the Bluetooth module 17 of the smart device 10. The voice input/output device may further include a connector 40 configured to connect an output-side lead wire which connects the Bluetooth module 17 of the manipulation unit 30 and the output unit 20 and passes through the D/A converter 51 and an input-side lead wire which connects the microphone 22 and the Bluetooth module 17 of the manipulation unit 30 and passes through the A/D converter 52. A voice signal transmitted by the Bluetooth module 17 of the smart device 10 may be input to the Bluetooth module 17 of the smart device 10 again.

The present disclosure provides for simultaneous connections of more than 500,000 global users within cloud grid system for the purpose of providing internet of things (IoT) platform service for web connectivity device.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Figure 1:
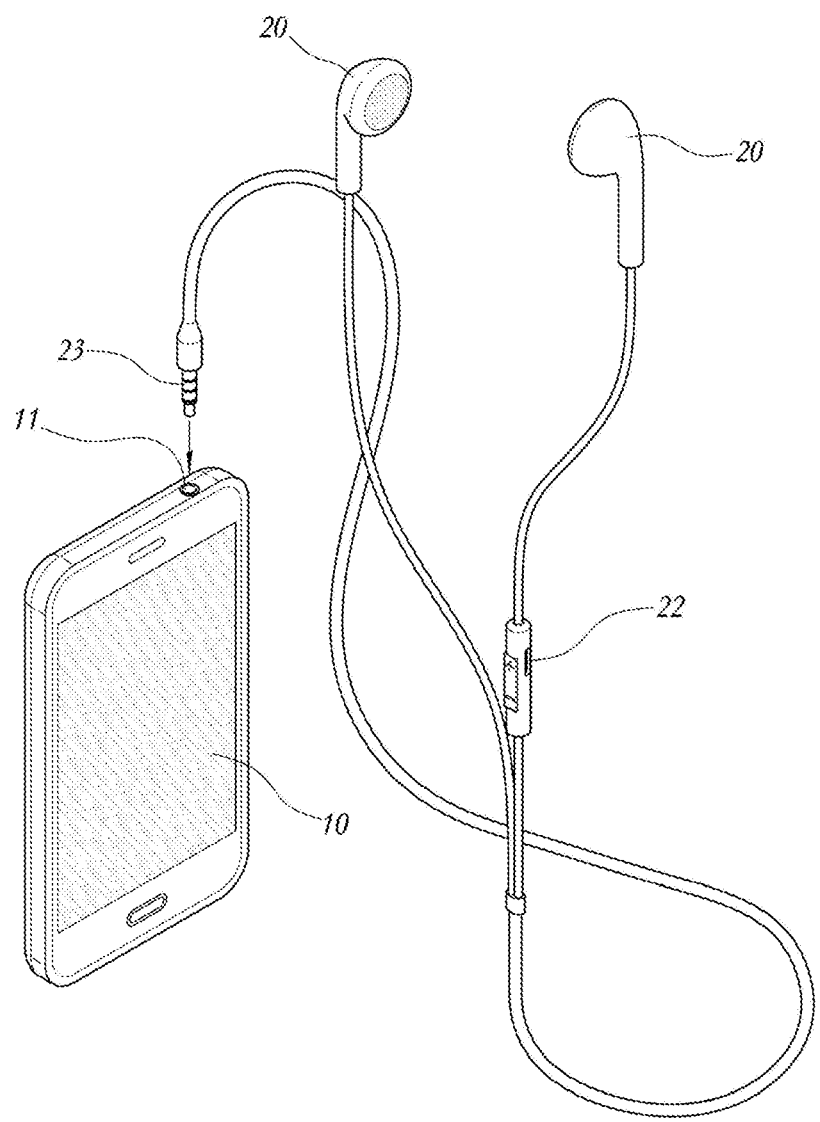
FIG. 1 is an exemplary perspective view showing a conventional microphone-mounted earphone for a smart device.

Hereinafter, a detailed configuration and operating principle according to an embodiment of the present disclosure are described with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
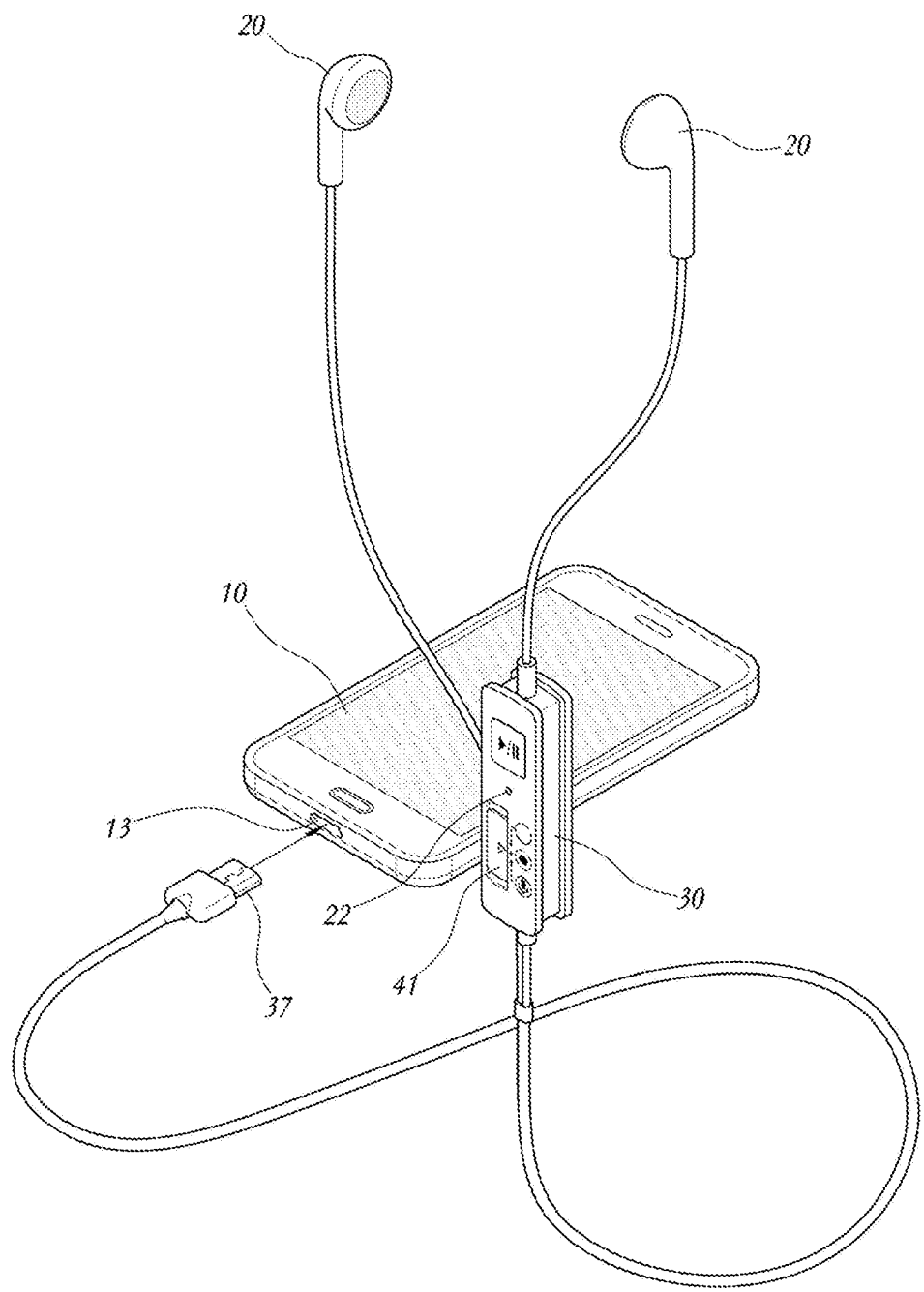
FIG. 2 is an exemplary perspective view showing an exemplary embodiment of the present disclosure.

As shown, FIG. 2 shows an external appearance and use state of a data return type voice input/output device for a smart phone in accordance with an exemplary embodiment of the present disclosure. As shown in FIG. 2, the data return type voice input/output device according to an exemplary embodiment of the present disclosure includes an output unit 20, (e.g., an ear receiver), a manipulation unit 30 on which a microphone 22 and a switch 41 are mounted, and a connector 37 (e.g., a microphone USB). As in FIG. 2, the connector 37 may be connected to the data port 13 of a smart device 10, (e.g., a smart phone). Digital data output by the smart device 10 may be input to the manipulation unit 30. The manipulation unit 30 may be configured to output a voice to the output unit 20 by processing the received digital data. A sound input to the microphone 22 of the manipulation unit 30 may be configured to be converted into digital data within the manipulation unit 30 and input to the data port 13 through the connector 37.

In other words, unlike a conventional earphone for the smart device 10 on which the microphone 22 is mounted, the data return type voice input/output device according to an embodiment of the present disclosure operates based on a digital signal not an analog signal. As shown in FIG. 2, the data return type voice input/output device may be connected to the digital data port 13 rather than the analog voice terminal 11 of the smart device 10. Accordingly, the loss or distortion of a voice signal accompanied by the process of processing the voice signal may be significantly reduced compared to a conventional technology in which an analog-based voice signal is transmitted.

Figure 3:
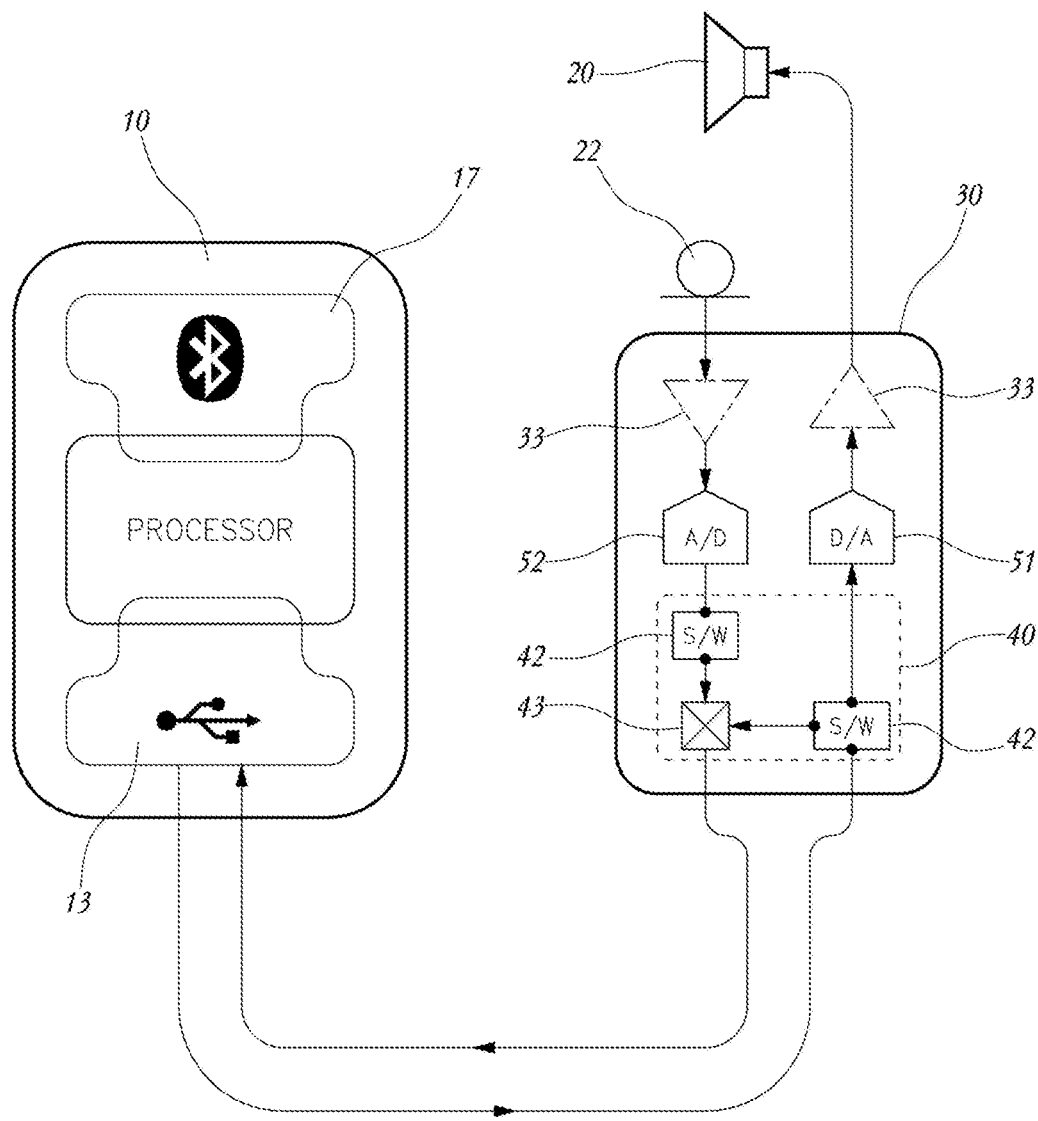
FIG. 3 is an exemplary diagram showing the configuration of an exemplary embodiment of the present disclosure to which a digital connector has been applied.

FIG. 3 shows a structure and electrical connection state in accordance with an exemplary embodiment of the present disclosure. As shown FIG. 3, according to an exemplary embodiment of the present disclosure, the manipulation unit 30 may be connected to the data port 13 of the smart device 10 to output data, that is, a digital voice signal. A D/A converter 51, an A/D converter 52 and a connector 40 may be disposed in the manipulation unit 30 that is connected to the microphone 22 and the output unit 20.

In particular, an embodiment of the present disclosure relates to a voice input/output device which is connected to the smart device 10 and from which a voice may be input or output. As shown in FIG. 3, the smart device 10 may include the data port 13 through which a digital signal may be input/output, and the voice input/output device may include the output unit 20 that may be configured to output an electrical signal in a voice form and the manipulation unit 30 connected to the microphone 22 that converts a voice into an electrical signal. The manipulation unit 30 may be connected to the data port 13 of the smart device 10. The manipulation unit 30 may include the D/A converter 51 connected to the output unit 20 and the A/D converter 52 connected to the microphone 22. Accordingly, a digital voice signal transmitted by the data port 13 may be converted into an analog voice signal through the D/A converter 51 and transferred to the output unit 20. An analog voice signal generated by the microphone 22 may be converted into a digital voice signal through the A/D converter 52 and transferred to the data port 13. In other words, the data port 13 and the output unit 20 are connected. An output-side lead wire that passes through the D/A converter 51 and an input-side lead wire that connects the microphone 22 and the data port 13 and passes through the A/D converter 52 may be connected by the connector 40.

As described above, since the lead wire that connects the data port 13 and the output unit 20 and the lead wire that connects the microphone 22 and the data port 13 are connected through the connector 40, a voice signal already output by the data port 13 may be extracted through the connector 40, may be input to the lead wire connecting the microphone 22 and the data port 13, and may be then input to the data port 13 again. Accordingly, an analog voice signal generated and converted by the execution of an operating system or application program mounted on the smart device 10 is not output by a speaker mounted on the smart device 10 or an ear receiver, propagated in the air, and input to the microphone 22 through the smart device 10 or the physical vibration of an earphone. Rather, in an exemplary embodiment of the present disclosure, when a digital voice signal is generated by the processor of the smart device 10 when an operating system or application program mounted on the smart device 10 is executed, the digital voice signal transmitted to the data port 13 may be input to the data port 13 of the smart device 10 electrically through the connector 40 without physical propagation. Accordingly, the loss or distortion of a sound may be significantly suppressed.

As shown in FIG. 3, a digital voice signal transmitted by the data port 13 of the smart device 10 may be configured to be converted into an analog voice signal through the D/A converter 51 of the manipulation unit 30. The digital voice signal may be configured to output a voice by driving the output unit 20, (e.g., an ear receiver or a speaker). An analog voice signal generated by the microphone 22 to which an external sound or a user's voice has been input may be converted into a digital voice signal through the A/D converter 52 and input to the data port 13 of the smart device 10. In particular, the output-side lead wire that connects the data port 13 and the D/A converter 51 and the input-side lead wire that connects the A/D converter 52 and the data port 13 may be connected by the connector 40. The digital voice signal output by the smart phone and transferred through the output-side lead wire may be introduced into the input-side lead wire. As a result, the digital voice signal may be input to the data port 13 of the smart device 10 again.

As shown in FIG. 3, the connector 40 that connects the output-side lead wire and the input-side lead wire may include switching unit 42 and a mixing unit 43. The switching unit 42 may be configured to regulate the electrical connection state of the connector 40 and may have various forms (e.g., a selection circuit, a switching element, a group of switching elements or a chipset). The mixing unit 43 may be configured to generate a voice signal that corresponds to a new sound in which a sound output by the smart device 10 and an externally input sound have been mixed by mixing a voice signal passing through the output-side lead wire and a voice signal passing through the input-side lead wire, and may input the generated voice signal to the data port 13.

As shown in FIG. 2, the switching unit 42 may be connected to the switch 41 mounted on the manipulation unit 30, and may be configured to regulate the connector 40 when a user manipulates the switch 41. Accordingly, the switching unit 42 may be configured to operate in various manners. For example, a sound output by the smart device 10 and an externally input sound may be input together to the data port 13 as described above, the sound output by the smart device 10 and the externally input sound may be alternatively input to the data port 13 or the input of the sound is blocked.

Figure 4:
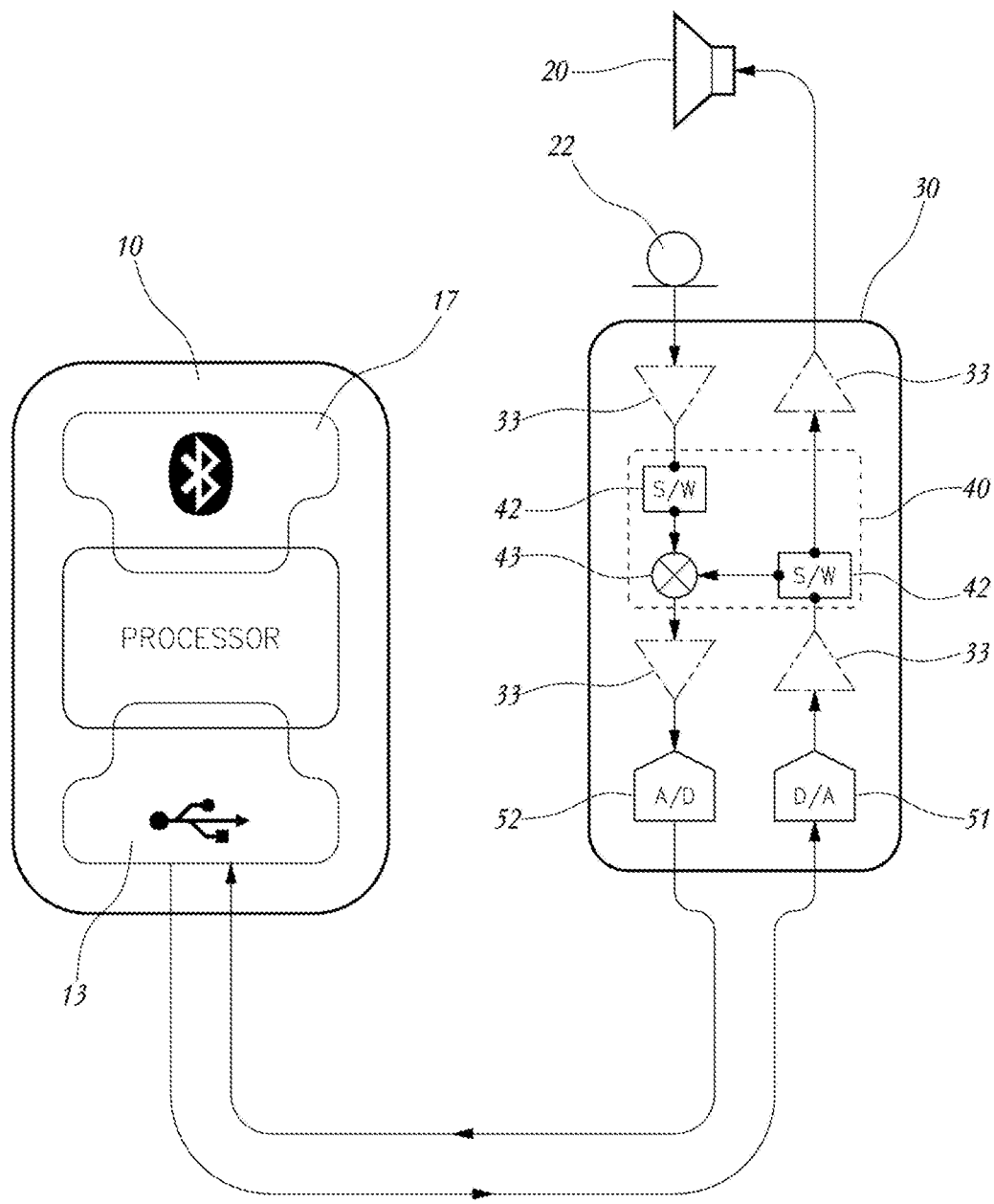
FIG. 4 is an exemplary diagram showing the configuration of an exemplary embodiment of the present disclosure to which an analog connector has been applied.

Furthermore, as indicated by chain double-dashed lines in FIG. 3, adjustment units 33 for the amplification, attenuation or noise reduction of a signal may be added to the output-side lead wire and the input-side lead wire, respectively. Accordingly, the adjustment unit 33 may function to increase or decrease the input/output of a voice signal to a proper output or to remove noise from the voice signal by adjusting a signal output through the output unit 20 or a signal generated by the microphone 22. In the exemplary embodiment of FIG. 3, a digital voice signal has been illustrated as being extracted through the output-side lead wire and then input to the input-side lead wire. FIG. 4 shows an exemplary embodiment in which an analog voice signal may be extracted. As shown in FIG. 4, a lead wire that connects the D/A converter 51 and the output unit 20 and a lead wire that connects the microphone 22 and the A/D converter 52 may be coupled together by the connector 40. In particular, the adjustment units 33 to adjust a voice signal may be alternatively configured at the front part or rear part of the connector 40 on the lead wire or may be configured on both sides of the front part and the rear part.

Figure 5:
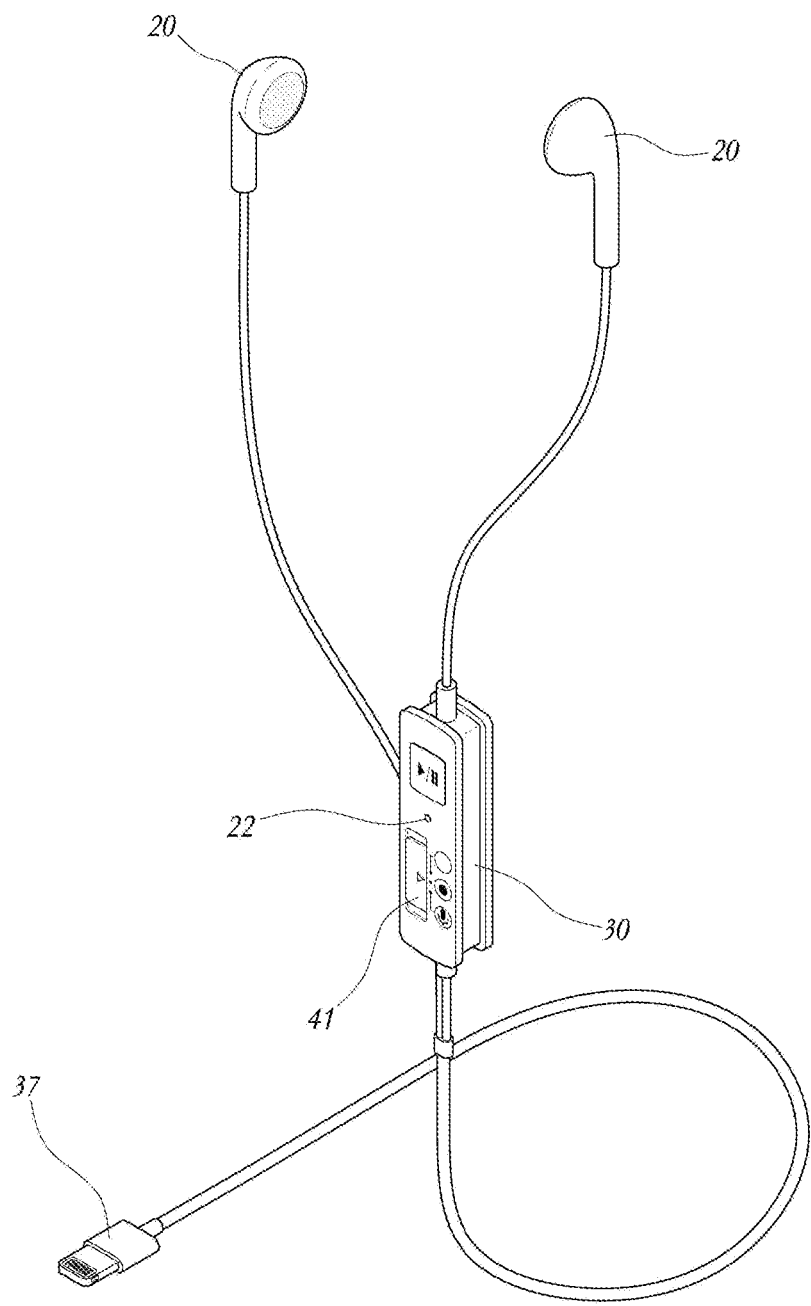
FIG. 5 is an exemplary perspective view showing an exemplary embodiment of the present disclosure to which a lightning connector has been applied.
Figure 6:
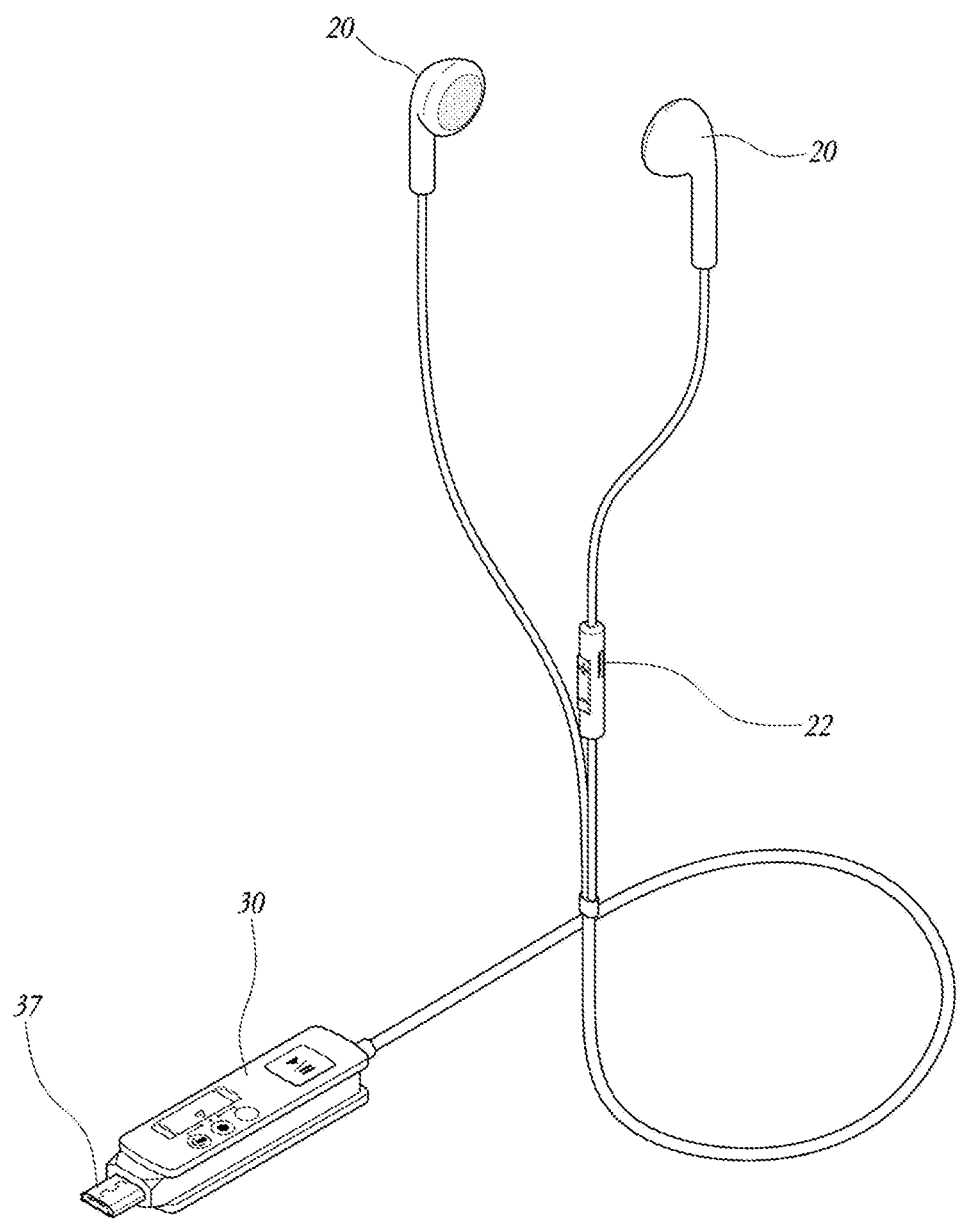
FIG. 6 is an exemplary perspective view showing an exemplary embodiment of the present disclosure to which a connector serial connection-type manipulation unit has been applied.
Figure 7:
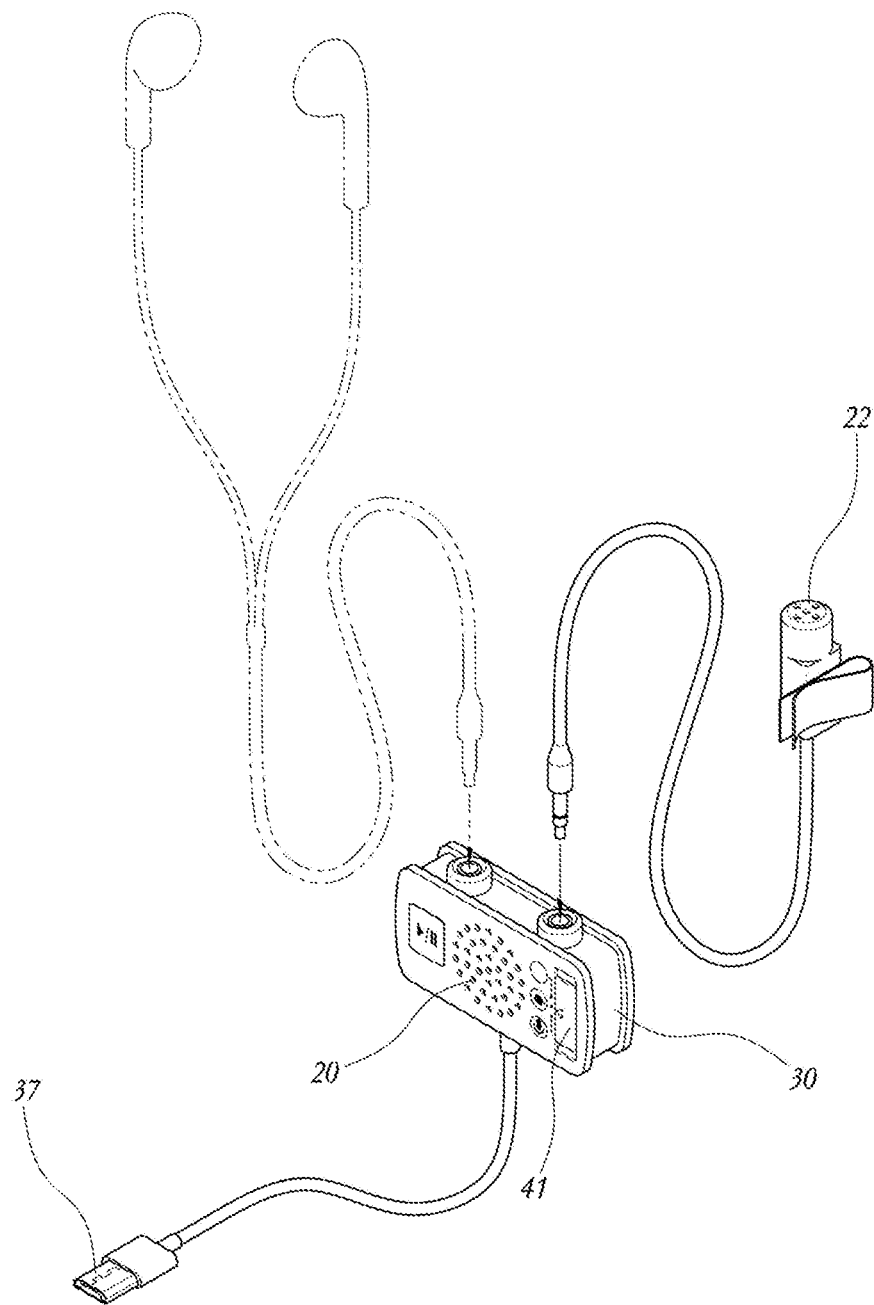
FIG. 7 is an exemplary perspective view showing an exemplary embodiment of the present disclosure with a speaker-embedded type manipulation unit has been applied.

FIGS. 5 to 7 illustrate various exemplary embodiments of the present disclosure. The various exemplary embodiments are slightly different in their external appearances or elements, but have the same basic configuration as those of FIGS. 3 and 4. FIG. 5 shows the application of a lightning connector 37 that is a connector 37 connected to the data port 13 of the smart device 10 and \ used in smart phones. FIG. 6 shows an exemplary embodiment in which the connector 37 is connected to the manipulation unit 30. In the exemplary embodiment of FIG. 6, a micro USB applied to smart phones has been applied as the connector 37.

Furthermore, FIG. 7 shows an exemplary embodiment in which the manipulation unit (30)-embedded speaker other than an ear receiver has been applied as the output unit 20. In the exemplary embodiment of FIG. 7, an external microphone 22 may be detachably connected to the manipulation unit 30 or a separate common earphone may be connected to the manipulation unit 30 as indicated by a double-dashed line.

Figure 8:
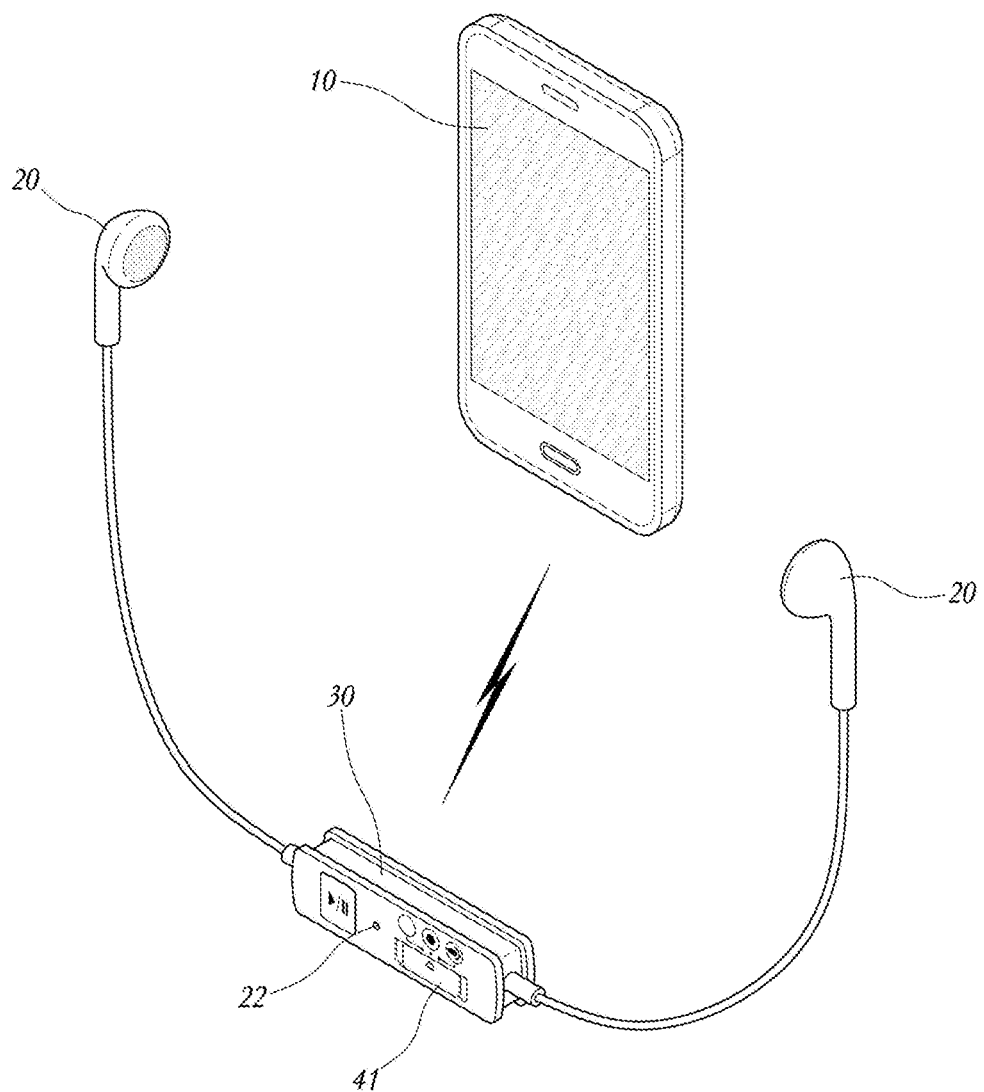
FIG. 8 is an exemplary perspective view showing an exemplary embodiment of the present disclosure to which a Bluetooth manipulation unit has been applied.
Figure 9:
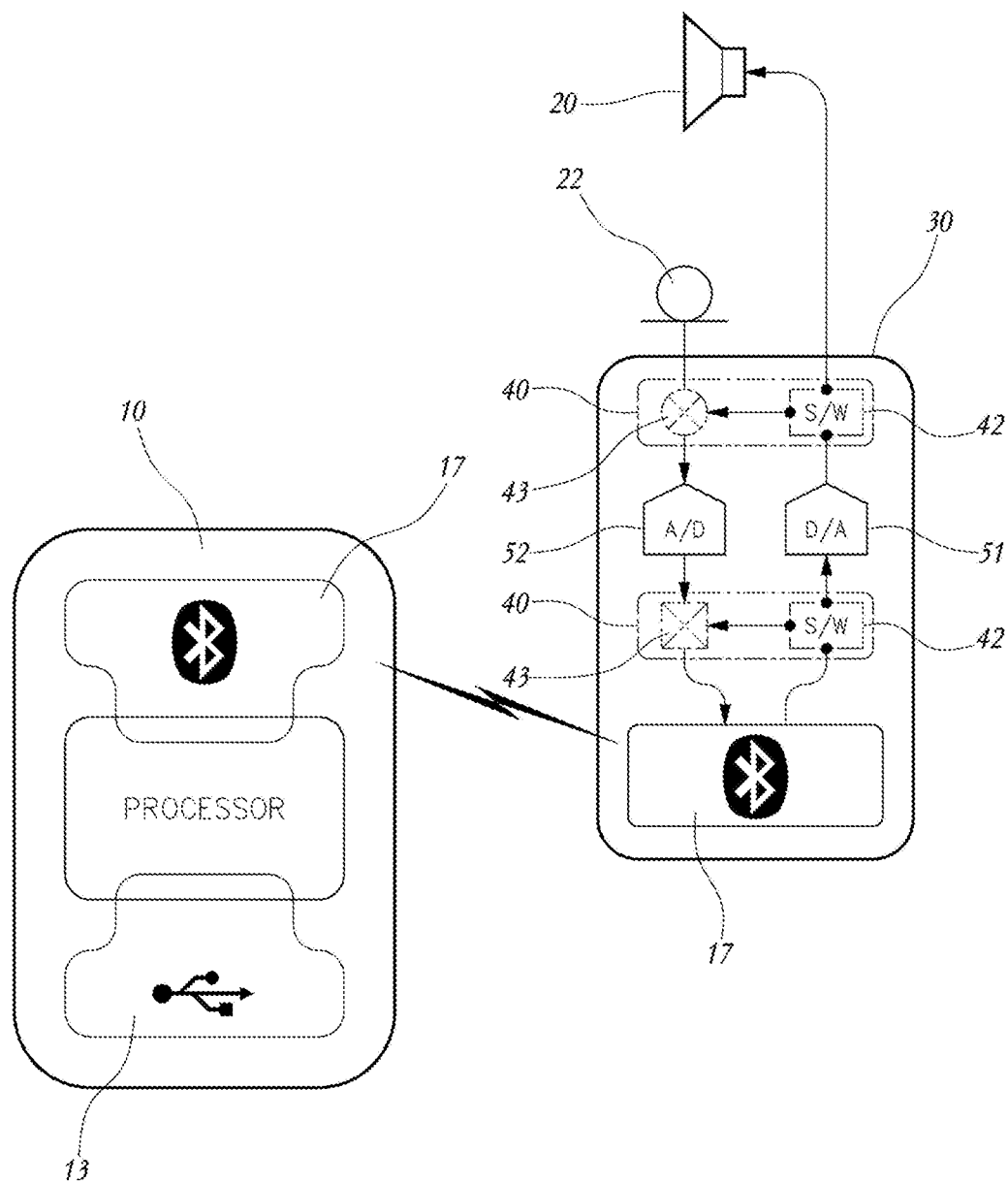
FIG. 9 is an exemplary diagram showing the configuration of the exemplary embodiment of FIG. 8.

FIGS. 8 and 9 shows an exemplary embodiment in which the smart device 10 and the manipulation unit 30 in accordance with an exemplary embodiment of the present disclosure are not connected in a wired manner through the data port 13 and the connector 37, but are connected through Bluetooth modules 17, that is. In other words the low power short-distance wireless communication modules are embedded in the smart device 10 and the manipulation unit 30, respectively.

As shown in FIG. 9, the Bluetooth module 17 may be mounted on the smart device 10. The voice input/output device of FIG. 9 may include an output unit 20 configured to output an electrical signal in a voice form and the manipulation unit 30 connected to a microphone 22 configured to convert a voice into an electrical signal. The manipulation unit 30 also may include a Bluetooth module 17 connected to the Bluetooth module 17 of the smart device 10. When the Bluetooth module 17 of the smart device 10 and the Bluetooth module 17 of the manipulation unit 30 are paired and thus a wireless communication path is established between the smart device 10 and the voice input/output device, as in the case where a digital voice signal is transferred through the data port 13 and the connector 37, a digital voice signal may be transmitted through the wireless communication path between the Bluetooth modules 17.

As shown in FIG. 9, a D/A converter 51 connected to the output unit 20 and an A/D converter 52 connected to the microphone 22 may be embedded in the manipulation unit 30. The D/A converter 51 and the A/D converter 52 may be connected to the Bluetooth module 17 embedded in the manipulation unit 30. A digital voice signal transmitted from the Bluetooth module 17 of the smart device 10 to the Bluetooth module 17 of the manipulation unit 30 may be configured to be converted into an analog voice signal through the D/A converter 51 and transferred to the output unit 20. An analog voice signal generated by the microphone 22 may be configured to be converted into a digital voice signal through the A/D converter 52, input to the Bluetooth module 17 of the manipulation unit 30, and wirelessly transmitted to the Bluetooth module 17 of the smart device 10.

In particular, a connector 40 may be configured to connect an output-side lead wire that connects the Bluetooth module 17 of the manipulation unit 30 and the output unit 20 and that passes through the D/A converter 51 and an input-side lead wire that connects the microphone 22 and the Bluetooth module 17 of the manipulation unit 30 and that passes through the A/D converter 52. Accordingly, a voice signal transmitted by the Bluetooth module 17 of the smart device 10 may be configured to be extracted and input to the Bluetooth module 17 of the smart device 10 again.

As indicated by double-dashed lines in FIG. 9, a digital method on the lower side of FIG. 9 or an analog method on the upper side of FIG. 9 may be applied to the connector 40 connecting the output-side lead wire and the input-side lead wire. As described above, even in the exemplary embodiment of FIG. 9 in which wireless transmission and reception are performed through the Bluetooth modules 17, as in the wired method exemplary embodiments of FIGS. 3 and 4, a switching unit 42 and a mixing unit 43 are configured in the connector 40 for connecting the output-side lead wire and the input-side lead wire. The switching unit 42 may have various forms (e.g., a selection circuit, a switching element, a group of switching elements and a chipset).

In accordance with an exemplary embodiment of the present disclosure, a voice signal output by the smart device 10 may be configured to be extracted using a simple earphone type device on which a common microphone 22 is mounted absent separate equipment, and the voice signal may be conveniently input to the smart device 10 again. Accordingly, the loss or distortion of a voice signal in the process of extracting and inputting the voice signal again may be minimized. Furthermore, user convenience and the utilization of the smart device 10 may be improved because its own output sound may be freely used as an input sound in a recording process through the smart device 10.

In particular, the voice input/output device according to an exemplary embodiment of the present disclosure has the same structure, use method and external appearance as a common earphone. Accordingly, the voice input/output device may be easily manipulated, the hearing of a sound through the output unit 20 (e.g., an ear receiver, voice input through the microphone 22), and a task for inputting a sound output by the smart device 10 again may be performed simultaneously. Furthermore, user convenience may be maximized because such functions can be optionally used.

While the present invention has been described with reference to the particular illustrative exemplary embodiments, it is not to be restricted by the embodiments but only by the appended claims. It is to be appreciated that those skilled in the art can change or modify the exemplary embodiments without departing from the scope and spirit of the present invention.

What is claimed is:

1. A data return type voice input/output device coupled to a smart device, for receiving or outputting a voice, the voice input/output device comprising:
    an output unit configured to output an electrical signal in a voice form;
    a manipulation unit coupled to a microphone configured to convert a voice into an electrical signal;
    a plurality of signal adjustment units disposed in the manipulation unit
    a connector disposed in the manipulation unit; and a data port disposed in the smart device configured to receive or output a digital signal, wherein the manipulation unit is coupled to the data port, the manipulation unit comprises a D/A converter connected to the output unit and an A/D converter connected to the microphone, a first lead wire connects the data port to the output unit and passes through the D/A converter without passing through the A/D converter, a second lead wire different from the first lead wire connects the data port to the microphone and passes through the A/D converter without passing through the D/A converter, the first lead wire is connected to the second lead wire through the connector, first and second signal adjustment units of the plurality of signal adjustment units are connected to the first lead wire and respectively positioned on opposite sides of the connector, third and fourth signal adjustment units of the plurality of signal adjustment units are connected to the second lead wire and respectively positioned on opposite sides of the connector, a digital voice signal is configured to be transmitted by the data port, converted into an analog voice signal through the D/A converter, and transmitted from the D/A converter to the second signal adjustment unit, the connector, the first signal adjustment unit, and the output unit, in order, and an analog voice signal is configured to be generated by the microphone, transmitted from the microphone to the third signal adjustment unit, the connector, the fourth signal adjustment unit, and the A/D converter, in order, converted into a digital voice signal through the A/D converter, and transferred to the data port.

2. The device of claim 1, wherein:

a voice signal is configured to be transmitted by the data port through the first lead wire, extracted through the connector, and transmitted back to the data port through the second lead wire.

3. The device of claim 1, wherein the connector includes a connector wire which connects the first lead wire to the second lead wire.

4. The device of claim 1, wherein the connector includes at least one of a switching unit and a mixing unit.

* * * * *